(12) United States Patent
Phaneuf

(10) Patent No.: US 8,267,325 B2
(45) Date of Patent: Sep. 18, 2012

(54) WRISTBAND WITH ELASTIC PORTION AND INELASTIC PORTION CONTAINING A RFID INLAY

(75) Inventor: Peter C. Phaneuf, Sparta, MI (US)

(73) Assignee: Avery Dennison Corporation, Pasadena, CA (US)

( * ) Notice: Subject to any disclaimer, the term of this patent is extended or adjusted under 35 U.S.C. 154(b) by 133 days.

(21) Appl. No.: 12/850,762

(22) Filed: Aug. 5, 2010

(65) Prior Publication Data

US 2011/0121082 A1    May 26, 2011

Related U.S. Application Data

(60) Provisional application No. 61/231,331, filed on Aug. 5, 2009.

(51) Int. Cl.
*G06K 19/06* (2006.01)

(52) U.S. Cl. .................................. 235/492; 235/380

(58) Field of Classification Search .................. 235/492, 235/375, 380, 382, 381, 383
See application file for complete search history.

(56) References Cited

U.S. PATENT DOCUMENTS

| | | | | |
|---|---|---|---|---|
| 2009/0255535 A1* | 10/2009 | Kanzer | ..................... | 128/206.14 |
| 2010/0043266 A1* | 2/2010 | Pedicano | ........................ | 40/633 |
| 2011/0041370 A1* | 2/2011 | Saint et al. | ....................... | 40/633 |
| 2012/0109399 A1* | 5/2012 | Tran | .............................. | 700/296 |

* cited by examiner

*Primary Examiner* — Thien M Le
(74) *Attorney, Agent, or Firm* — Avery Dennison Corporation

(57) ABSTRACT

A radio frequency identification (RFID) device includes: a first substantially inelastic portion (12); a second substantially elastic portion (14); and an RFID inlay (16) provisioned to wirelessly communicate with a reader device, wherein the RFID inlay (16) is at least one of carried on or encapsulated in the first portion (12). A compressible foam or mesh (13) is provided to create an air gap to increase the read range of the RFID inlay (16).

14 Claims, 3 Drawing Sheets

WRISTBAND WITH ELASTIC PORTION AND INELASTIC PORTION CONTAINING A RFID INLAY

CROSS-REFERENCE TO RELATED APPLICATION

The present application claims priority from U.S. Provisional Application No. 61/231,331 filed Aug. 5, 2009, which is incorporated herein by reference in its entirety.

FIELD OF THE INVENTION

The present inventive subject matter relates generally to the art of radio frequency (RF) communications and/or other like wireless or over-the-air (OTA) telecommunications. Particular relevance is found in connection with wristbands or the like that contain radio frequency identification ("RFID") devices or other similar telecommunication devices, and accordingly the present specification makes specific reference thereto. However, it is to be appreciated that aspects of the present inventive subject matter are also equally amenable to other like applications.

BACKGROUND OF THE INVENTION

RFID devices are generally known in the art. Conventionally, RFID receivers, transmitters and/or transponders (collectively referred to herein as RFID "devices") are widely used to associate a tagged or labeled object with an identification code and/or other information provided by the RFID device. RFID devices are conventionally used, e.g., to track inventory, parcels and/or other objects. In some applications, RFID devices are used to identify and/or track particular individuals, e.g., wearing the RFID devices.

A typical RFID device generally includes a number of components including an antenna for wirelessly transmitting and/or receiving RF signals and analog and/or digital electronics operatively connected thereto. So called active or semi-passive RFID devices may also include a battery or other suitable power source. In conventional parlance, the RFID electronics along with any operatively connected antenna and/or power source are collectively referred to as the RFID inlay. Commonly, the electronics are implemented via an integrated circuit (IC) or microchip or other suitable electronic circuit and may include, e.g., communications electronics, data memory, control logic, etc. In operation, the IC or microchip functions to store and/or process information, modulate and/or demodulate RF signals, as well as optionally performing other specialized functions. In general, RFID devices can typical retain and communicate enough information to uniquely identify individuals, packages, inventory and/or other like objects, e.g., to which the RFID device is affixed.

Commonly, an RFID reader or base station is used to wirelessly obtain data or information (e.g., such as the aforementioned identification code) communicated from an RFID device. The manner in which the RFID reader interacts and/or communicates with the RFID device generally depends on the type of RFID device. A given RFID device is typically categorized as a passive device, an active device, a semi-passive device (also known as a battery-assisted or semi-active device) or a beacon type RFID device (which can be thought of as a sub-category of active devices). Passive RFID devices generally use no internal power source, and as such, they are passive devices which are only active when an RFID reader is nearby to power the RFID device, e.g., via wireless illumination of the RFID device with an RF signal and/or electromagnetic energy from the RFID reader. Conversely, semi-passive and active RFID devices are provided with their own power source (e.g., such as a small battery). To communicate, conventional RFID devices (other than so called beacon types) respond to queries or interrogations received from RFID readers. The response is typically achieved by backscattering, load modulation and/or other like techniques that are used to manipulate the RFID reader's field. Commonly, backscatter is used in far-field applications (i.e., where the distance between the RFID device and reader is greater than approximately a few wavelengths), and alternately, load modulation is used in near-field applications (i.e., where the distance between the RFID device and reader is within approximately a few wavelengths).

Passive RFID devices typically signal or communicate their respective data or information by backscattering a carrier wave from an RFID reader. That is to say, in the case of conventional passive RFID devices, in order to retrieve information therefrom, the RFID reader typically sends an excitation signal to the RFID device. The excitation signal energizes the RFID device which transmits the information stored therein back to the RFID reader. In turn, the RFID reader receives and decodes the information from the RFID device.

As mentioned earlier, passive RFID devices commonly have no internal power supply. Rather, power for operation of a passive RFID device is provided by the energy in the incoming RF signal received by the RFID device from the RFID reader. Generally, a small electrical current induced in the antenna of the RFID device by the incoming RF signal provides just enough power for the IC or microchip in the RFID device to power up and transmit a response. This means that the antenna generally has to be designed both to collect power from the incoming signal and also to transmit the outbound backscatter signal.

Passive RFID devices have the advantage of simplicity and long life (e.g., having no battery to go dead). Nevertheless, their performance may be limited. For example, passive RFID devices generally have a more limited range as compared to active RFID devices.

Active RFID devices, as opposed to passive ones, are generally provisioned with their own transmitter and a power source (e.g., a battery, photovoltaic cell, etc.). In essence, an active RFID device employs the self-powered transmitter to broadcast a signal which communicates the information stored on the IC or microchip in the RFID device. Commonly, an active RFID device will also use the power source to power the IC or microchip employed therein.

Broadly speaking, there are two kinds of active RFID devices—one can be generally thought of as a transponder type of active RFID device and the other as a beacon type of active RFID device. A significant difference is that active transponder type RFID devices are only woken up when they receive a signal from an RFID reader. The transponder type RFID device, in response to the inquiry signal from the RFID reader, then broadcasts its information to the reader. As can be appreciated, this type of active RFID device conserves battery life by having the device broadcast its signal only when it is within range of a reader. Conversely, beacon type RFID devices transmit their identification code and/or other data or information autonomously (e.g., at defined intervals or periodically or otherwise) and do not respond to a specific interrogation from a reader.

Generally, active RFID devices, due to their on-board power supply, may transmit at higher power levels (e.g., as compared to passive devices), allowing them to be more robust in various operating environments. However, the battery or other on-board power supply can tend to cause active RFID devices to be relatively larger and/or more expensive to manufacture (e.g., as compared to passive devices). Additionally, as compared to passive RFID devices, active RFID devices have a potentially more limited shelf life—i.e., due to the limited lifespan of the battery. Nevertheless, the self supported power supply commonly permits active RFID devices to include generally larger memories as compared to passive devices, and in some instances the on-board power source also allows the active device to include additional functionality, e.g., such as obtaining and/or storing environmental data from a suitable sensor.

Semi-passive RFID devices are similar to active devices in that they are typically provisioned with their own power source, but the battery commonly only powers the IC or microchip and does not provide power for signal broadcasting. Rather, like passive RFID devices, the response from the semi-passive RFID device is usually powered by means of backscattering the RF energy received from the RFID reader, i.e., the energy is reflected back to the reader as with passive devices. In a semi-passive RFID device, the battery also commonly serves as a power source for data storage.

A conventional RFID device will often operate in one of a variety of frequency ranges including, e.g., a low frequency (LF) range (i.e., from approximately 30 kHz to approximately 300 kHz), a high frequency (HF) range (i.e., from approximately 3 MHz to approximately 30 MHz) and an ultra-high frequency (UHF) range (i.e., from approximately 300 MHz to approximately 3 GHz). A passive device will commonly operate in any one of the aforementioned frequency ranges. In particular, for passive devices: LF systems commonly operate at around 124 kHz, 125 kHz or 135 kHz; HF systems commonly operate at around 13.56 MHz; and, UHF systems commonly use a band anywhere from 860 MHz to 960 MHz. Alternately, some passive device systems also use 2.45 GHz and other areas of the radio spectrum. Active RFID devices typically operate at around 455 MHz, 2.45 GHz, or 5.8 GHz. Often, semi-passive devices use a frequency around 2.4 GHz.

The read range of an RFID device (i.e., the range at which the RFID reader can communicate with the RFID device) is generally determined by many factors, e.g., the type of device (i.e., active, passive, etc.). Typically, passive LF RFID devices (also referred to as LFID or LowFID devices) can usually be read from within approximately 12 inches (0.33 meters); passive HF RFID devices (also referred to as HFID or HighFID devices) can usually be read from up to approximately 3 feet (1 meter); and passive UHF RFID devices (also referred to as UHFID devices) can be typically read from approximately 10 feet (3.05 meters) or more. One important factor influencing the read range for passive RFID devices is the method used to transmit data from the device to the reader, i.e., the coupling mode between the device and the reader—which can typically be either inductive coupling or radiative/propagation coupling. Passive LFID devices and passive HFID devices commonly use inductive coupling between the device and the reader, whereas passive UHFID devices commonly use radiative or propagation coupling between the device and the reader.

In inductive coupling applications (e.g., as are conventionally used by passive LFID and HFID devices), the device and reader are typically each provisioned with a coil antenna that together form an electromagnetic field therebetween. In inductive coupling applications, the device draws power from the field, uses the power to run the circuitry on the device's IC or microchip and then changes the electric load on the device antenna. Consequently, the reader antenna senses the change or changes in the electromagnetic field and converts these changes into data that is understood by the reader or adjunct computer. Because the coil in the device antenna and the coil in the reader antenna have to form an electromagnetic field therebetween in order to complete the inductive coupling between the device and the reader, the device often has to be fairly close to the reader antenna, which therefore tends to limit the read range of these systems.

Alternately, in radiative or propagation coupling applications (e.g., as are conventionally used by passive UHFID devices), rather than forming an electromagnetic field between the respective antennas of the reader and device, the reader emits electromagnetic energy which illuminates the device. In turn, the device gathers the energy from the reader via its antenna, and the device's IC or microchip uses the gathered energy to change the load on the device antenna and reflect back an altered signal, i.e., backscatter. Commonly, UHFID devices can communicate data in a variety of different ways, e.g., they can increase the amplitude of the reflected wave sent back to the reader (i.e., amplitude shift keying), shift the reflected wave so its out of phase with respect to the received wave (i.e., phase shift keying) or change the frequency of the reflected wave (i.e., frequency shift keying). In any event, the reader picks up the backscattered signal and converts the altered wave into data that is understood by the reader or adjunct computer.

The antenna employed in an RFID device is also commonly affected by numerous factor, e.g., the intended application, the type of device (i.e., active, passive, semi-active, etc.), the desired read range, the device-to-reader coupling mode, the frequency of operation of the device, etc. For example, insomuch as passive LFID devices are normally inductively coupled with the reader, and because the voltage induced in the device antenna is proportional to the operating frequency of the device, passive LFID devices are typically provisioned with a coil antenna having many turns in order to produce enough voltage to operate the device's IC or microchip. Comparatively, a conventional HFID passive device will often be provisioned with an antenna which is a planar spiral (e.g., with 5 to 7 turns over a credit-card-sized form factor), which can usually provide read ranges on the order of tens of centimeters. Commonly, HFID antenna coils can be less costly to produce (e.g., compared to LFID antenna coils), since they can be made using techniques relatively cheaper than wire winding, e.g., lithography or the like. UHFID passive devices are usually radiatively and/or propagationally coupled with the reader antenna and consequently can often employ conventional dipole-like antennas.

Using an RFID device to track and/or identify an individual or object is not unknown in general. In particular, wearable RFID devices are known in the art. See, e.g., Published U.S. Patent Application of Oberle (Pub. No. 2008/0117024), which discloses an RFID wristband. Still, there are limitations and/or drawbacks associated with some conventional approaches to wearable RFIDs. For example, in some prior art solutions, the RFID inlay or some portion thereof may be formed or arranged on or incorporated in a flexible or elastic or otherwise insufficiently rigid and/or insufficiently hard substrate or encapsulant. Accordingly, the RFID device can be eventually destroyed or its performance severely degraded by stress and/or stain applied to the RFID inlay. That is to say, bending, twisting, stretching, folding or other like manipulations or other such actions or forces, if experienced by the RFID inlay, can damage the RFID device and/or impair its functionality.

However, on the contrary, employing an RFID device which is entirely rigid or hard can be unsatisfactory as well. For example, this can limit the usefulness of wearable RFID devices. In particular, it may limit the ability of the wearable RFID device to conform to different shapes and/or sizes. That is to say, it is often convenient to attach a wearable RFID device to an individual by wrapping and/or securing the device around an appendage of the individual wearing the device, e.g., around the wear's wrist or ankle or elsewhere. Yet, different individuals to which the wearable RFID device may be attached can have different size wrists, ankles, etc. Accordingly, it would be advantageous to have a common wearable RFID device which fits multiple sizes. Likewise, it would be advantageous to have a wearable RFID device that can selectively expand, e.g., to fit over a wear's hand or foot, and then contract to be securely held around the wear's wrist or ankle. As can be appreciate, an RFID device which is entirely rigid and/or hard generally will not readily fulfill the aforementioned goals in a sufficiently satisfactory manner.

Accordingly, a new and/or improved RFID device is disclosed which addresses the above-referenced problem(s) and/or others.

SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

In accordance with one embodiment, a radio frequency identification (RFID) device is provided. The RFID device includes: a first substantially inelastic portion; a second substantially elastic portion; and an RFID inlay provisioned to wirelessly communicate with a reader device, wherein the RFID inlay is at least one of carried on or encapsulated in the first portion.

In connection with another exemplary embodiment of the presently described invention, radio frequency identification (RFID) device is provided and includes a RFID inlay having a substrate with an antenna portion disposed thereon and a chip connected to the antenna portion. A first substantially inelastic portion with the RFID inlay substantially contained within the inelastic portion. A second substantially elastic portion with the first and second portions forming a band having an upper surface and a lower surface. A foam or mesh layer disposed on the lower surface to form an air gap between the lower surface of the band and an appendage of a wearer.

The band may include indicia related to the event or theme for which the band was created. The indicia may be provided on the band, such as by printing or labeling or encapsulated or otherwise incorporated in the band.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The inventive subject matter disclosed herein may take form in various components and arrangements of components, and in various steps and arrangements of steps. The drawings are only for purposes of illustrating preferred embodiments and are not to be construed as limiting. Further, it is to be appreciated that the drawings may not be to scale.

DETAILED DESCRIPTION OF THE EMBODIMENT(S)

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

In general, there is disclosed herein an RFID device including at least one first portion which is substantially inelastic, hard and/or rigid and at least one second portion which is substantially flexible and/or elastic. Suitably, the device's RFID inlay is supported on and/or encapsulated in the first portion. In one exemplary embodiment, the RFID device is a wearable RFID device, such as a band or wristband. In particular, the wearable RFID device is arranged to be wrapped and/or secured around an appendage or other body part of the wearer, e.g., about the wrist, ankle or elsewhere. Suitably, the first and second portions of the RFID device together form a continuous and/or unbroken closed loop. In one optional embodiment, the aforementioned RFID device is a passive UHFID device employing an inlay including at least an RFID IC or microchip that is operatively connected to an antenna.

The band or wristband of the present invention may be made by injection molding or by laminating multiple layers together.

Figure 1:
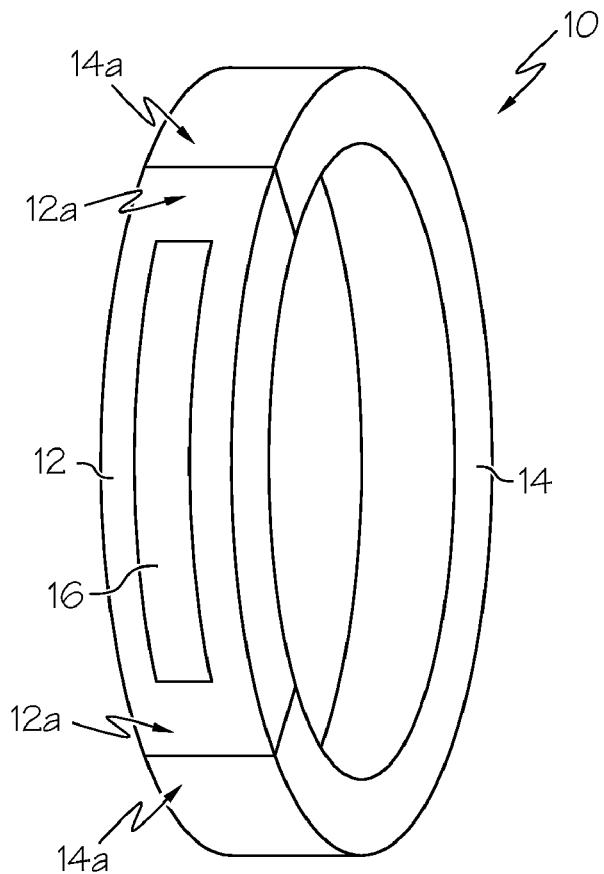
FIG. 1 is a diagrammatic illustration showing an exemplary RFID device in accordance with aspects of the present inventive subject matter.

With reference now to FIG. 1, there is shown an exemplary RFID device 10 including: a first portion 12, which is formed and/or made from a substantially inelastic, hard and/or rigid material (e.g., a relatively high durometer material); and, a second portion 14, which is formed and/or made from a substantially flexible and/or elastic material (e.g., a relatively low durometer material). Suitably, as shown, the first portion 12 carries an RFID inlay 16. Exemplary RFID inlays for use with the present invention are available from Avery Dennison RFID Company of Clinton, S.C. The RFID inlay 16 will have a substrate, which may include an adhesive, an antenna portion and chip or strap portion connected to the antenna portion.

Figure 4:
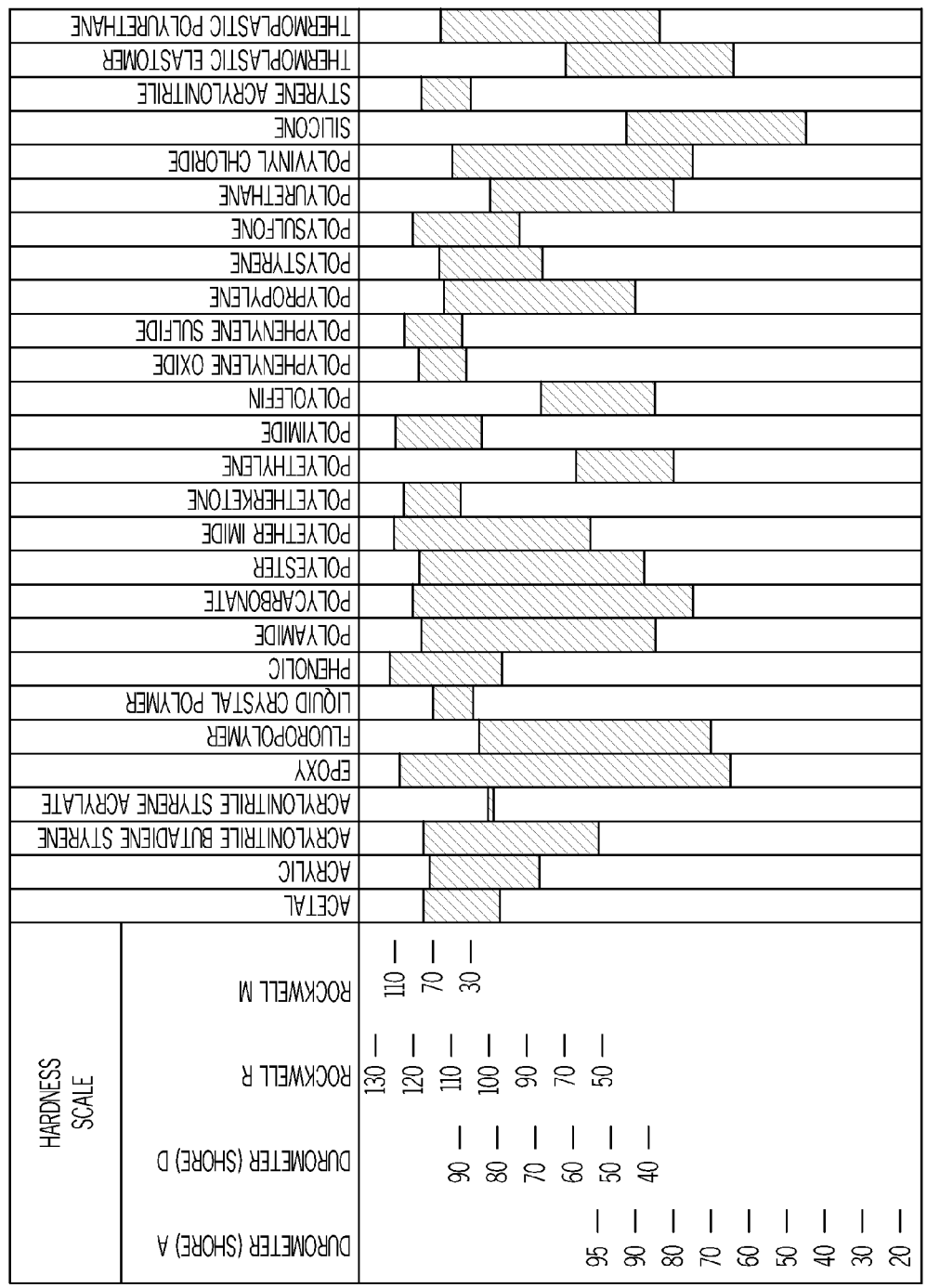
FIG. 4 is a chart of harness measurements of selected materials.

Hardness measurement of rubber, plastic and other non-metallic materials are described in ASTM standard D2240. Type A is used for soft rubber, plastics and elastomers which are used in connection with the present invention. FIG. 4 illustrates an exemplary chart showing hardness measurements of particular materials.

Optionally, the RFID inlay 16 may be supported on the first portion 12 or encapsulated therein. The RFID inlay 16 includes, for example, an RFID IC or microchip and/or other suitable electronics, an antenna operatively connected thereto and an optional power source, such as a battery. Suitably, the RFID IC or microchip or other suitable electronics include, e.g., communications electronics, data memory, control logic, etc. In operation, the IC or microchip and/or other electronics function to store and/or process information, modulate and/or demodulate RF and/or other signals, as well as optionally performing other specialized and/or conventional RFID functions. Suitably, the RFID device 10 is a passive UHFID device.

In the illustrated embodiment, the RFID device 10 takes the form of a wristband intended to be worn by an individual around their wrist, e.g., for the purpose of tracking and/or identifying the wearer or for associating information or data maintained in or on the RFID device 10 with the wearer or otherwise for such suitable purposes as conventional RFID devices may be employed. However, it is to be appreciated that a similar RFID device in accordance with aspects of the present inventive subject matter may take other alternate forms or they may be intended for other similar applications. Other suitable forms of RFID devices include without limitation, other forms of wearable RFID devices (e.g., anklets or ankle-bands, neckbands or necklaces, headbands, finger rings or toe rings, etc.) or other forms of RFID devices not intended for wearing by an individual. For example, the RFID device may be intended for securing around some other object for tracking, identification, inventory or other suitable purposes. In any event, the dimensions of the RFID device 10 are suitably chosen in accordance with the particular application for which the RFID device 10 is intended.

As shown in the illustrated embodiment, the first portion 12 and the second portion 14 of the device 10 together form a continuous and/or unbroken closed loop. Optionally, either of the first or the second portion can be made from a suitable plastic or rubber or other similar type of material. Alternately, both portions can be made from the same type of material or each can be made from a different material type. The first and second portions 12 and 14 of the device 10 may be integrally formed, or alternately, suitably connected to one another at adjoining ends 12a and 14a, respectively. For example, ends 12a and 14a are optionally joined to one another using one or more of the following: one or more adhesives, sonic or heat or other suitable welding, fasteners (not shown), melting and/or laminating together, etc. Suitably, the ends 12a and 14a of the respective portions 12 and 14 are "permanently" joined to one another. That is to say, once joined, the ends 12a and 14a are not readily disengaged from one another without the destruction of or damage to at least one of the respective portions 12 and/or 14.

Figure 2A:
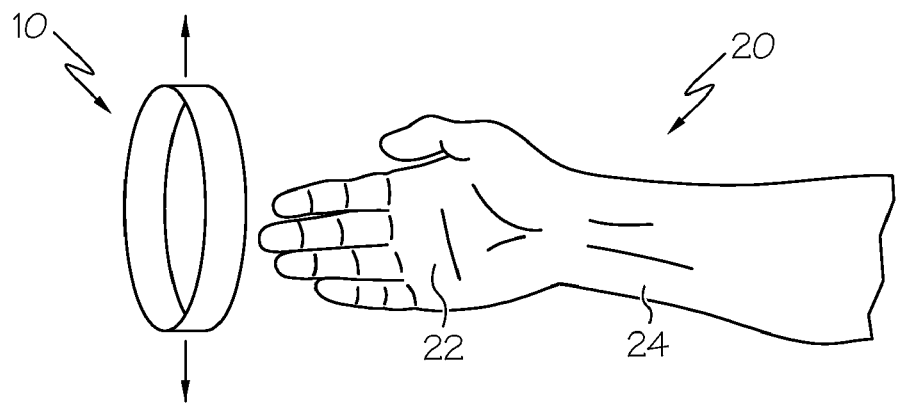
FIGS. 2A-2C are diagrammatic illustrations showing an exemplary use of the RFID device from FIG. 1.
Figure 2B:
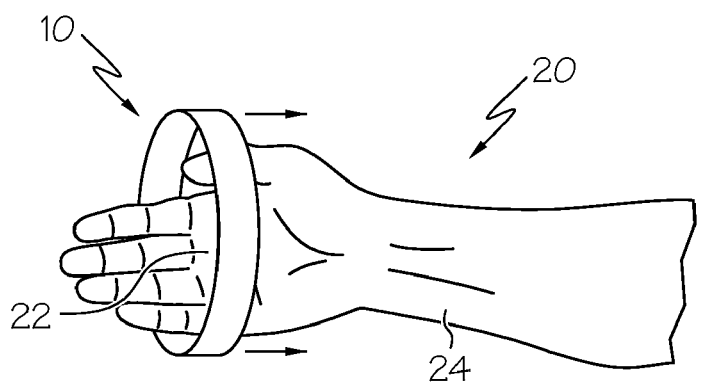
Figure 2C:
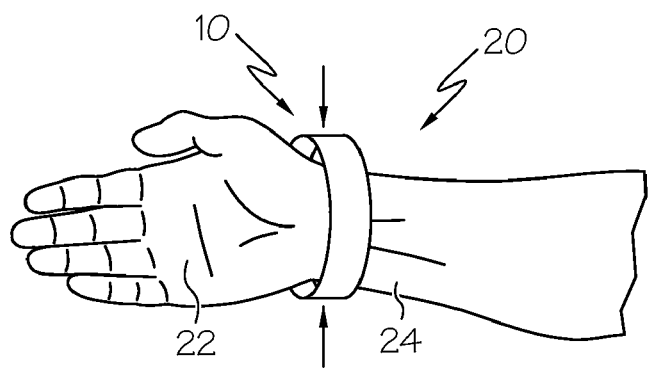

With reference now to FIGS. 2A-2C, to secure the RFID 10 to an object (e.g., such the illustrated object 20), the elastic portion 14 is optionally expanded (as shown in FIG. 2A) so that the closed loop fits around and/or over an enlarged distal or free end 22 of the object 20. The enlarged distal or free end 22 of the object 20 may then be inserted through the closed loop of the RFID device 10 and/or the RFID device 10 may be past over the enlarged end 22 of the object 20 (as shown in FIG. 2B). Once positioned around and/or otherwise encircling a relatively narrower portion 24 of the object 20, the elastic portion 14 of the RFID device 10 is allowed to return to its unexpanded state (as shown in FIG. 2C) thereby securing the RFID device 10 to the object 20—that is, insomuch as the size of the closed loop is now smaller than the enlarged end 22 of the object 20. Of course, as can be appreciated, the RFID 10 may take the form of a wristband or ankle-band and the object 20 may represent an appendage (e.g., an arm or leg) of an individual. For example, the enlarged end 22 may represent a hand or foot at the end of the respective appendage and the relatively narrower portion 24 of the object 20 may represent the respective wrist or ankle.

Of course, the RFID device 10 may also be wrapped around and/or secured to other objects similar to the object 20, but optionally without the enlarged end 22, for example. In such cases, it is advantageous that the RFID device 10 encircles an outer surface of the object and squeezes and/or grips the same, e.g., as a result of an elastic force applied by the second portion 14 of the RFID device 10. Accordingly, to achieve the aforementioned squeezing or gripping, suitably the inner diameter or other like dimension of the closed loop, when the portion 14 is in its unexpanded state, is the same as or somewhat less than the outer diameter or other like dimension of the object at the location where the RFID device 10 is to be positioned. However, when the portion 14 is in its expanded state, suitably the inner diameter or other like dimension of the closed loop is somewhat greater than the outer diameter or other like dimension of the object at the location where the RFID device 10 is to be positioned. In operation then, the elastic portion 14 is optionally expanded so that the closed loop fits around and/or over a distal or free end of an object. The distal or free end of the object may then be inserted through the closed loop of the RFID device 10 and/or the RFID device 10 may be past over the end of the object. Once positioned around and/or otherwise encircling the object at a desired location, the elastic portion 14 of the RDIF device 10 is allowed to return toward its at rest state thereby securing the RFID device 10 to the object—that is, insomuch as the elastic force of the portion 14 causes the object to be squeezed or gripped within the closed loop of the RFID device 10.

Again, as indicated previously, the first portion 12 containing or holding the RFID inlay 16 is generally inelastic and optionally hard and/or rigid. In particular, the first portion 12 is optionally made from a relatively high durometer material, e.g., as compared to the second portion 14. Accordingly, the RFID inlay 16 is protected from various stresses and/or stains (i.e., as a result of stretching, twisting, folding, bending, or other like manipulations or forces) which could tend to damage the inlay 16 or otherwise negatively impact its functionality. Conversely, the second portion 14 is generally elastic and/or optionally flexible. In particular, the second portion 14 is optionally made from a relatively low durometer material, e.g., as compared to the first portion 12. Accordingly, the RFID device 10 is able to selectively expand to fit over otherwise larger objects, and/or the device 10 can apply a squeezing or gripping force to secure the RDIF device 10 to selected objects.

Figure 3:
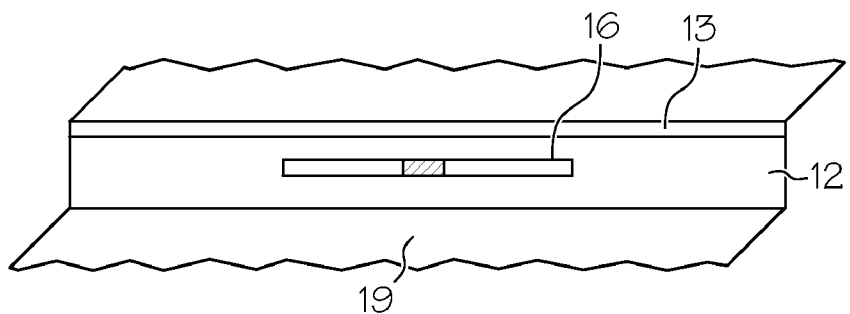
FIG. 3 provides a cross sectional view of the wristband.

Turning now to FIG. 3 in which a cross section of the wristband of the presently described invention is provided. For convenience, reference numerals used for the description in FIG. 1 will be repeated in the present description. The RFID inlay 16 is shown encapsulated within the first portion of the band 12. In addition, a compressible foam or mesh 13 has been added to the underside of the band 14 so as to provide an additional air space between the wearer and the RFID inlay 16. The air gap will help increase the read range of the RFID inlay 16 to potentially greater than three meters and thereby decrease the interference caused by the human flesh. The foam or mesh 13 also may provide comfort to the wearer of the band.

The RFID inlay 16 may be positioned closer to the surface of the band 14, centrally disposed in the band 14 as shown in FIG. 3 or may be closer to the base portion of the band 14 depending on the design requirements.

FIG. 3 also shows the use of indicia 19 which may be printed on the surface of the band 14, imbedded in the band as part of the manufacturing process or included as a label applied to the band. In the latter instance, a pressure sensitive label may be used to apply the indicia to the band.

In any event, it is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A radio frequency identification (RFID) device, the RFID device comprising:
   a RFID inlay, the inlay having a substrate with an antenna portion disposed thereon and a chip connected to the antenna portion;
   a first substantially inelastic portion with the RFID inlay substantially contained within the inelastic portion;
   a second substantially elastic portion;
   the first and second portions are joined together forming a band having an upper surface and a lower surface; and
   a foam or mesh layer disposed on the lower surface to form an air gap between the lower surface of the band and an appendage of a wearer.

2. A radio frequency identification (RFID) device of claim 1, wherein indicia is applied to the upper surface of the band.

3. A radio frequency identification (RFID) device of claim 2, wherein the indicia is embedded in the band.

4. A radio frequency identification (RFID) device of claim 2, wherein indicia is applied as a label over the upper surface of the band.

5. A radio frequency identification (RFID) device of claim 1, wherein the first portion is made from a first material having a higher durometer than a second material from which the second portion is made.

6. A radio frequency identification (RFID) device of claim 1 wherein the first portion is a plastic or rubber.

7. A radio frequency identification (RFID) device of claim 1 wherein the second portion is a plastic or rubber.

8. A radio frequency identification (RFID) device of claim 1 wherein the first and second portions are joined using one or more of the following: adhesives, sonic or heat or other suitable welding, fasteners, melting and laminating together.

9. A radio frequency identification (RFID) device of claim 1 wherein the RFID device is a wristband.

10. A radio frequency identification (RFID) device of claim 1 wherein the RFID device is an ankle-band.

11. A radio frequency identification (RFID) device of claim 1 wherein the second substantially elastic portion has an expanded and an unexpanded state.

12. A radio frequency identification (RFID) device of claim 1 wherein the RFID inlay is positioned closer to the surface of the band.

13. A radio frequency identification (RFID) device of claim 1 wherein the RFID inlay is centrally disposed in the band.

14. A radio frequency identification (RFID) device of claim 1 wherein the RFID inlay is positioned closer to the base portion of the band.

* * * * *